United States Patent [19]
Park et al.

[11] Patent Number: 5,858,542
[45] Date of Patent: Jan. 12, 1999

[54] LAMINATED GLAZING UNIT COMPRISING COPOLYMERS OF VINYL CHLORIDE, ALLYL GLYCIDYL ETHER, AND A VINYL ESTER AND METHOD OF MAKING THE SAME

[75] Inventors: Hung S. Park, Avon Lake; David A. Strickler; Anthony A. Parker, both of Toledo, all of Ohio

[73] Assignee: Libbey-Owens-Ford Co., Toledo, Ohio

[21] Appl. No.: 821,510

[22] Filed: Mar. 21, 1997

Related U.S. Application Data

[60] Continuation of Ser. No. 751,745, Nov. 18, 1996, abandoned, which is a division of Ser. No. 513,693, Aug. 11, 1995, Pat. No. 5,641,845.

[51] Int. Cl.$^6$ ...................................................... B32B 17/10
[52] U.S. Cl. ........................................... 428/441; 428/442
[58] Field of Search ..................................... 428/441, 442

[56] References Cited

U.S. PATENT DOCUMENTS

| | | |
|---|---|---|
| 2,075,575 | 3/1937 | Douglas et al. . |
| 2,147,154 | 2/1939 | Fikentscher et al. . |
| 2,603,620 | 7/1952 | Walter et al. . |
| 2,852,499 | 9/1958 | Benedict et al. . |
| 3,036,039 | 5/1962 | Howe et al. . |
| 3,168,594 | 2/1965 | Hoshi et al. . |
| 3,172,877 | 3/1965 | Fishbein et al. . |
| 3,230,206 | 1/1966 | Albert et al. . |
| 3,468,859 | 9/1969 | Davies et al. . |
| 3,501,440 | 3/1970 | Kamio et al. . |
| 3,514,428 | 5/1970 | Wood . |
| 3,632,542 | 1/1972 | Fox et al. . |
| 4,178,423 | 12/1979 | Anderson et al. . |
| 4,999,071 | 3/1991 | Nakamura et al. . |
| 5,091,487 | 2/1992 | Hori et al. ................................. 526/87 |
| 5,593,786 | 1/1997 | Parker et al. ............................ 428/426 |

*Primary Examiner*—Jeffery T. Smith
*Assistant Examiner*—Wu C. Cheng
*Attorney, Agent, or Firm*—Marshall & Melhorn

[57] ABSTRACT

An improved method is provided for copolymerizing vinyl chloride with allyl glycidyl ether and a vinyl ester. The copolymers so formed include 70–99 weight % of vinyl chloride, 0.05–15 weight % of allyl glycidyl ether, and 0.05–15 weight % of a vinyl ester, preferably vinyl acetate. The copolymers of this invention can be compounded to provide films exhibiting improved heat stability, low haze, and good adhesion to solid surfaces such as glass and metal. The compounded resins thus obtained may be especially advantageously used in forming the interlayer of laminated safety glazings, such as vehicle windshields and architectural glazings.

14 Claims, No Drawings

LAMINATED GLAZING UNIT COMPRISING COPOLYMERS OF VINYL CHLORIDE, ALLYL GLYCIDYL ETHER, AND A VINYL ESTER AND METHOD OF MAKING THE SAME

This application is a continuation of application Ser. No. 08/751,745, filed Nov. 18, 1996, now abandoned, which is a Division of application Ser. No. 08/513,693 filed Aug. 11, 1995, now U.S. Pat. No. 5,641,845.

FIELD OF THE INVENTION

This invention relates to copolymers of vinyl chloride with allyl glycidyl ether and a vinyl ester. More particularly, the invention relates to a suspension polymerization process for polymerizing vinyl chloride with allyl glycidyl ether and a vinyl ester, preferably vinyl acetate, to produce a resin for forming films having good heat stability, low haze and good adhesion.

SUMMARY OF RELATED ART

It is well known that vinyl chloride can be homopolymerized as well as copolymerized with numerous monomers. Those polymers have been widely used in various kinds of applications for many years. Over the years, many attempts have been made to improve the physical properties of these polymers. The incorporation of comonomers into vinyl chloride has often been aimed specifically at increasing the polymer's thermoplastic flow under processing conditions and improving the polymer's solubility characteristics, while retaining the toughness and generally good physical properties of the vinyl chloride homopolymers. Generally, the copolymerization of vinyl chloride has become an alternative means of reducing the severity of the processing conditions needed to fabricate the resins into the desired final articles.

The copolymers of vinyl chloride with vinyl acetate comonomer are by far the most important commercial products among the vinyl chloride copolymers. The content of vinyl acetate typically ranges from about 3% to 20%, and the molecular weight can range from very low to moderately high. The higher the level of bound vinyl acetate, the greater the tendency for the colloids to destabilize during polymerization. These copolymers may be prepared by solution, emulsion, or suspension polymerization, depending upon the desired properties of the resins. The details of such a solution polymerization are disclosed in U.S. Pat. No. 2,075,575, and the details of a suspension polymerization are described in U.S. Pat. No. 3,172,877. These vinyl chloride/vinyl acetate copolymer resins have been used commercially mainly in the preparation of floor tiles.

It is also known that the copolymerization of vinyl chloride with ethylene or propylene offers an effective way to reduce the glass transition temperature of the copolymer with low levels of comonomer, and to increase flexibility for nonrigid applications. These olefins act as degradative chain transfer agents, thereby tending to retard the rate of polymerization of the vinyl chloride. Unless highly active initiators are used, the polymerization becomes very sluggish. The polymerization of vinyl chloride with ethylene is taught in U.S. Pat. No. 3,501,440. The polymerization of vinyl chloride with propylene is described in U.S. Pat. No. 3,468,859.

It is also known to copolymerize vinyl ethers with vinyl chloride to develop a material suitable as a surface coating applied as solvent solution, or to improve the processability of polyvinyl chloride. The suspension and emulsion copolymerization techniques for making such copolymers can be found in U.S. Pat. No. 3,168,594.

The incorporation of acrylates or acrylonitrile into vinyl chloride polymers modifies the properties and suitable end-use applications therefor. The copolymers with long chain acrylates provide a low glass transition temperature and improved adhesion and flexibility. The copolymers with acrylonitrile produce resins which are suitable for forming fibers and films. Most copolymerizations of vinyl chloride with acrylonitrile have been carried out via emulsion, as described in U.S. Pat. No. 2,603,620. The chemically homogeneous copolymers of vinyl chloride with acrylates are difficult to synthesize due to the drastic difference in monomer reactivity ratios. U.S. Pat. No. 3,230,206 teaches a technique for controlling the chemical heterogeneity of such a copolymer.

Functional groups have been incorporated into polyvinyl chloride resin, typically to make good protective coating materials. Those functional groups improve abrasion resistance and impart flexibility to the resins. U.S. Pat. No. 2,147,154 discloses a method for binding carboxylic functional groups by polymerizing vinyl chloride with acrylic acid in emulsion. Hydroxyl functional groups have been brought into the polymer by polymerizing vinyl chloride with vinyl acetate and subsequently saponifying the copolymer, as described in U.S. Pat. No. 2,852,499. Vinyl chloride has also been copolymerized with allyl alcohol and dibutyl fumarate, as disclosed in U.S. Pat. No. 3,036,039. The mixture of ally alcohol, vinyl chloride, and dibutyl fumarate was polymerized at 120° F. in the absence of any solvent.

In U.S. Pat. No. 3,632,542, a method is disclosed for copolymerizing vinyl chloride with ethylene and vinyl acetate. The resulting copolymers contained 5–25% ethylene, 10–35% vinyl chloride, and 40–85% vinyl ester. These copolymers were purported to form films having good resistance to hydrolysis by aqueous alkali.

Mori et al. teach a method for preparing an interlayer film of a laminated safety glass in U.S. Pat. Nos. 4,382,996 and 4,389,508. The film was prepared with a thermoplastic resin composed of 80–98.5 weight % vinyl chloride, 1–10 weight % glycidyl methacrylate, and 0.5–10 weight % ethylene. The interlayer was proclaimed to have superior penetration resistance, good handleability in bonding, and high bond strength.

In U.S. Pat. No. 5,091,487, Hori et al. discuss an emulsion polymerization process for forming a vinyl chloride resin which is constituted of particles, each having a particle diameter of at most 5 $\mu$m. The resin particles are formed of a copolymer comprising vinyl chloride and an epoxy-containing monomer, wherein the epoxy content of the outer portion of the particle is higher than that of the inner portion thereof. While various polymerization processes are mentioned, all of the illustrative examples are of the emulsion polymerization of vinyl chloride and glycidyl methacrylate. The vinyl chloride resin so formed is then included in a plastisol, which can be placed between two glass sheets and allowed to gel by heating to form a laminated safety glass. The resin obtained by the Hori et al. process, however, is not suitable for use in a calendering or extrusion process, requires relatively high temperatures to obtain adequate adhesion, and appears to result in a safety glass having high haze.

Thus, in spite of all the progress made so far, vinyl chloride polymers having good heat stability, low haze, good adhesion and requiring low processing temperatures are yet to be developed.

SUMMARY OF THE INVENTION

This invention relates to a method for copolymerizing vinyl chloride with allyl glycidyl ether and a vinyl ester. In particular, the copolymers so formed consist of 70–99 weight % of vinyl chloride, 0.05–15 weight % of allyl glycidyl ether, and 0.05–15 weight % of a vinyl ester, preferably vinyl acetate. Optionally, other copolymerizable monomers can be included up to 20 weight %, but are preferably 10 weight % or less. Vinyl ethers are examples of such copolymerizable monomers which may advantageously be included. Alkyl vinyl ethers, such as octadecyl vinyl ether, are preferred.

The copolymers of this invention can be compounded to provide films exhibiting improved heat stability, low haze, and good adhesion to solid surfaces such as glass and metal. The compounded resins thus obtained may be especially advantageously used in forming the interlayer of laminated safety glazings, such as vehicle windshields and architectural glazings.

DESCRIPTION OF THE PREFERRED EMBODIMENT

The present invention relates to the copolymerization of vinyl chloride with allyl glycidyl ether and a vinyl ester, optionally in the presence of one or more other copolymerizable monomers. It is believed that the inclusion of the vinyl ester results in improved adhesion. It is also believed that the presence of allyl glycidyl ether imparts improved heat stability to the polymers, and also provides improved adhesion beyond that which is provided by the inclusion of vinyl ester alone. The combination of allyl glycidyl ether with the vinyl ester also provides unexpectedly low haze. The polymers of this invention are aimed at being compounded to make films with good heat stability, low haze, and good adhesion. It is noted that the polymers which show good heat stability also exhibit good light stability.

It is possible to produce the polymers of this invention by suspension polymerization, emulsion polymerization, or solution polymerization. However, when the polymers are intended for use in applications requiring low haze, good adhesion, and low processing temperatures, suspension polymerization is by far preferred. The high surfactant level used in emulsion polymerization interferes with adhesion. In addition, the relatively small particle size of the polymer resulting from emulsion polymerization prevents processing via calender or extrusion, limiting further processing to plastisol fusion requiring thermoforming process temperatures which are higher than desirable for many applications, including the formation of a safety glass laminate. Solution polymerization is inappropriate for many applications since the molecular weight of the resulting polymer is limited to levels which are lower than desired. There are also environmental and cost concerns associated with solution polymerization.

Monomer

The copolymers of this invention are produced by polymerizing at least three monomers. Additionally, other copolymerizable monomers may be incorporated into the polymers. The level of vinyl chloride is kept at from about 70 weight % up to 99 weight %. The suitable content of allyl glycidyl ether is at least 0.05% by weight. If the amount of allyl glycidyl ether exceeds 15%, the molecular weight of the copolymers will likely be too low, resulting in a polymer having insufficient tensile and impact strengths for many applications. In order to minimize gelation that may occur with excess allyl glycidyl ether alone, and hence to impart sufficient processability and adhesion of the polymers to solid surfaces such as metal and glass, the copolymers ought to have at least 0.05 weight % of a vinyl ester. Suitable vinyl esters include vinyl acetate, vinyl propionate, etc., with vinyl acetate being preferred.

The adhesion of the copolymers can also be boosted significantly with the addition of proper kinds of silane compounds during the polymerization or at the compounding stage. If more than 15 weight % of vinyl ester is included, the colloidal stability during polymerization is adversely affected, the drying of the polymers becomes unusually difficult, and the resulting polymers have a porosity which is too low to absorb the additives satisfactorily during compounding.

Other copolymerizable comonomers include monomeric esters such as ethyl acrylate, methyl methacrylate, glycidyl methacrylate, hydroxyethyl (meth)acrylate, etc.; monomeric ethers such as isobutyl vinyl ether, trimethylolpropane monoallyl ether, diallyl ether, octadecyl ether, etc. olefins such as ethylene, propylene, etc.; monomeric hydrocarbons such as styrene, $\alpha$-methyl styrene, etc.; acrylonitrile; monomeric amines such as 2-vinylpyridine, allyldimethylamine, etc.; monomeric silanes such as vinyltriacetoxy silane, $\gamma$-methacryloxypropyltrimethoxysilane, etc.; monomeric ketones such as methyl vinyl ketone, $\alpha$-acetoxystyrene, etc; and so on.

Solvent

In suspension polymerization, the solvent is usually deionized water. A minor amount of hydrocarbon or polar solvent, such as hexane or methanol, can be added to facilitate homogeneous dispersion of the initiators. The usage level of the deionized water is preferably equal to or higher than 100 parts per hundreds of monomers (phm).

Initiator

In accordance with the process of this invention, initiators are used which are miscible with hydrocarbon solvents. Examples of those initiators include diacyl peroxides such as lauroyl peroxide, benzoyl peroxide, etc.; peroxydicarbonates such as di(2-ethylhexyl)peroxydicarbonate, di(sec-butyl)peroxydicarbonate, etc.; peroxyesters such as t-butyl peroxyneodecanoate, t-butyl peroxypivalate, etc.; peroxides such as acethylcyclohexylsulfonyl peroxide, 3,4,5-trimethylhexanoyl peroxide, etc.; azo compounds such as azobis, 2,4-dimethyl valero nitrile, azobis(4-methoxy-2,4-dimethylvaleronitrile), etc.; and so on. As an option, initiators miscible with water may be used as well.

The initiators may be used singly or in combinations of two or more to keep the level of free radicals steady throughout the polymerization. Generally, the initiator or initiator mixture is used in an amount in the range of about 0.01 to 0.5 phm. In the case of a fast polymerization, or extremely low molecular weight polymer, initiators in an amount higher than 0.5 phm may be used, if the heat of polymerization can be handled adequately.

Emulsifier

This invention does not impose any restriction on the choice of emulsifiers. Any dispersant used in the trade is usable. Examples of suitable emulsifiers include water-soluble cellulose esters such as hydroxypropylmethyl cellulose, hyroxyethyl cellulose, etc.; water-soluble polymers such as partially saponified polyvinyl alcohols, polyacrylic acid, gelatin, etc.; non-ionic surfactants such as sorbitan monolaurate, polyethyleneoxide sorbitan stearate, etc.; and so on. These emulsifiers are frequently used in combination of two or more to enhance the stability of the suspension droplets formed by agitation and balance the properties of the resin at the same time. The preferred level of the emulsifiers is about 0.03 to 0.5 phm.

Short-stopping Agent

The polymerization is terminated when the vinyl chloride conversion into polyvinyl chloride is in the range of from about 50% to 90%. The polymerization is usually terminated with the addition of short-stopping agents or stabilizers which inhibit polymerization. An exemplary stabilizer is a sulfur-containing organo-tin stabilizer, especially di-n-butyl tin, S,S'-bis-(isooctyl mercaptoacetate), as well as organo phosphite, and mixed salts thereof. Other exemplary short-stopping agents include α-methyl styrene, hydroquinone, bisphenol-A; thioalcohols; acetone thiosemicarbazone; and amines. The short-stopping agent is preferably used in amounts ranging from about 0.005 phm to about 2 phm.

Other Additives

Other additives may be added to the aforementioned ingredients for polymerization in accordance with this invention. Examples of such other additives include scale inhibitors such as nitric acid, oxalic acid, etc.; defoamers such as dimethyl silicones, ethylene oxidepropylene oxide block polymers, etc.; chain transfer agents such as trichloroethylene, mercapto ethanol, etc.; chelating agents such as diethylene triamine pentaacetic acid, ethylene diamine tetraacetic acid, etc.; and so on. Other additives which may be incorporated include the family of tri-alkoxy organofunctional silanes which can act as defoamers and as adhesion promoters or coupling agents in subsequent compounding and in the end use of the final resin. These silane coupling agents can be of the vinyl functional type and can thus be chemically copolymerized, or they can be of other types which can be introduced during the polymerization or post-polymerization to the slurry prior to drying. These additives can be added in any suitable amount, as is known by those skilled in the art.

Suspension Polymerization

The suspension polymerization in accordance with the invention can be carried out batchwise or semibatchwise. Semibatch is usually preferred in order to achieve a homogeneous composition of copolymers when the reactivity ratios are quite different. Predominately, batch polymerization is utilized due to its simplicity and low cost of operation. In a batch polymerization, all of the ingredients are charged into a clean reactor before the on-set of polymerization. The reactor can be fabricated with stainless steel or can be cladded with glass. Subsequent to the charge of all ingredients, the reactor is heated up to a predetermined temperature in the range of 40° C. to 80° C. with adequate agitation. The consideration of conversion and porosity determines the allowance for the total polymerization time, which is generally in the range of from 3 hours to 15 hours. The polymerization is terminated with a proper kind of short-stopping agent when the pressure in the reactor head space drops to the predetermined level coinciding with the targeted degree of conversion. Thereafter, the slurries, which are formed through the phase change of liquid monomer droplets to discrete solid particles, are transferred to a stripping column, where the residual monomers are stripped from the resin particles by subjecting the slurries to steam under vacuum. The steam-stripped slurry is then sent to a dryer through a centrifuge.

Resin Characterization

The resins were characterized by seven measurements: degree of polymerization, bulk density, plasticizer absorption, average particle size, fish eyes, haze, and heat stability.

Degree of polymerization was determined according to Japanese Industry Standard ("JIS") K-6721-1977.

Bulk density is the weight per unit volume of PVC including voids inherent in the PVC. The unit is g/cc. These test methods provide useful indexes of performance of plastic materials with respect to their handling in packaging and fabrication. The bulk density is a measure of the fluffiness. The procedure for determining bulk density is well described in ASTM D1895-89(1990).

Plasticizer absorption (plasticizer take-up) was determined according to ASTM D3367 (75)-1990. The test method covers determination of the plasticizer absorption of PVC using a controlled centrifugal force. Plasticizer absorption of the test sample is reported in percentage.

The measurements for average particle size followed the procedure in ASTM D1921-89. The test methods cover the measurement of the particle size of plastic materials in the powdered granular or pelleted forms in which they are commonly supplied.

The procedure in ASTM D3592-92 is used for determination of fisheyes in PVC homopolymer resins and similar resins. The presence of fisheyes in a film or sheet lower the product quality. The number of clear, undyed spots in a sheet of 100 cm$^2$ is counted as the number of fisheyes. The sample resin, mixed with the plasticizer, stabilizer, and colorant, is milled on a hot roll. A sheet with constant thickness is formed under fixed conditions.

The degree of haze, or wide angle diffuse scattering of light, was determined by following the procedure described in ASTM D1003. The specimens were prepared by a sequence of roll milling and hot pressing. The specimens were roll milled at 190° C. for 5 minutes. The operation conditions for hot pressing were to keep the specimens at 180° C. for 5 minutes for pre-heating, at 180° C. for 5 minutes under 100 kg/cm$^2$, and then at 25° C. for 3 minutes cooling. The specimen size was 80 mm×45 mm×3.2 mm. The measurements were done with a Model SM-6 hazemeter made by Suga Test Instrument Co. using an illuminate C source of light. The degree of haze was reported in percentage.

The method used to determine the heat stability of each specimen was as follows. A specimen was prepared with a twin mill made by Nishimura of Japan. The roll surface temperature was kept at 145° C. The specimen was then subjected to rolling for 5 minutes and 30 seconds. The thickness of the specimen was 0.7 mm. The formulation compounded for the specimens was 100 parts per hundred parts resin ("phr") of the vinyl chloride polymer resin, 40 phr dioctyl phthalate ("DOP"), 2 phr of a liquid tin stabilizer (Stabilizer BC 747 available from Ciba-Geigy), and 0.3 phr stearic acid as a lubricant. The specimen sheet coming out of the twin roll mill was then cut into a 450 mm×30 mm×0.7 mm specimen strip. The specimen strip was placed in a Mathis Thermotester, Model LTF-ST-152293 manufactured by Werner Mathis of Switzerland. The Thermotester oven was kept at 185° C. with a strip moving pace of approximately 19 mm/5 minutes. The time taken for the specimen strip to be discolored to black is reported in minutes.

A specimen with the size, 70 mm×70 mm×0.7 mm was prepared from the sheet made to test the adhesion. The specimen was inserted between two glass plates of 70 mm×70 mm×0.7 mm, and put into an oven for 10 minutes. The temperature of the oven was kept at 200° C. The rating was classified as poor or good by the effort required to separate the specimen from the glass plate.

Product Applications

The polymers which are produced by the method in accordance with this invention can be used to fabricate films with improved heat stability, low haze, and good adhesion. The polymers of this invention have a degree of polymerization of at least about 400, and preferably at least about 530. A degree of polymerization lower than about 400 will result in a loss of mechanical properties, such as impact resistance, in the final product. For certain applications, such as for forming an interlayer for a laminated safety glazing, the polymers of this invention preferably have a degree of polymerization of at least about 900.

The polymers of this invention also have an average of particle size of at least about 10 μm, and preferably at least about 30 μm. If the average particle size is less than about 10 μm, then the films formed therewith generally exhibit high haze and the porosity of the particles is disadvantageously low, resulting in difficulties in compounding. On the other hand, if the average particle size is greater than about 250 μm the porosity may again be so low that difficulties in compounding are experienced.

As noted above, use of these polymers is especially advantageous in the formation of interlayers for laminated safety glazings, which are composed of an interlayer bonding together two glass plates or sheets so that breaking the glass results in minimum dispersion of broken glass fragments. Such an interlayer must possess a number of properties, including: high impact energy adsorption to minimize concussive injury; shear and tear strength sufficient to prevent rupture of the interlayer by the broken glass; sufficient adhesion to the glass to inhibit laceration on contact with, and prevent dispersion of, broken glass; acceptable thermal heat stability and weatherability; and good optical quality after processing the laminates with conventional equipment such as prepresses and autoclaves at temperatures as low as 140° C. The interlayer must possess and maintain these properties over the wide range of temperatures in which these laminated glazings are used.

Certainly, the polymers of this invention can be used in many other applications for high performance flexible resins as well.

EXAMPLE 1

The following examples are illustrative of the invention and do not constitute any limitation with regard to the subject matter of the invention. Six different specimens are compiled. Two of them are controls which are used to compare with the four polymers made by the method of this invention.

The polymerization was carried as follows:

1. The inner surfaces of reactor were cleaned thoroughly. The volume of the reactor was 1 m³. The reactor was equipped with a Pfaudler agitator, 2 cooling baffles, and a condenser.
2. The inner surfaces of the reactor were coated with a scale inhibitor.
3. The deionized water was charged to the reactor and an agitator activated.
4. The emulsifiers and all other additives were charged to the reactor.
5. The initiators were added.
6. Mixing was maintained for 30 minutes, while the vacuum was pulled down to 30 mm Hg.
7. The monomers were then added. The total amount of vinyl chloride charged into the reactor wads 280 kg. Accordingly, the quantities of other ingredients were adjusted.
8. The polymerization temperature was maintained at 53° C.
9. The polymerization was terminated with the addition of 0.04 phm of Bisphenol-A, when the head space pressure reached 90 psi.
10. The slurry was then transferred from the reactor to a stripping column.

Various resin compositions and the resulting characteristics of each resin are presented at Table 1. All of the amounts listed in Table 1 are in weight % unless otherwise indicated. Control A was chosen to see whether an acrylic monomer with an epoxy group could provide the desired properties. The test results show that, while adhesion to a glass surface was good, the polymer with glycidyl methacrylate and vinyl acetate exhibits a high level of fisheyes, high haze, and poor heat stability. Control B was selected to see whether vinyl acetate alone provide the properties needed for high performance films. The polymer with vinyl acetate also exhibited high haze and poor heat stability. In addition, adhesion to a glass surface was poor. Consequently, Control A and B were not acceptable for applications requiring the properties noted above, such as for a safety glass interlayer.

The test data from P1 to P4 illustrate the simultaneous presence of allyl glycidyl ether and vinyl acetate in the polymers provide the physical properties needed for the film. Those polymers indeed have low haze and excellent heat stability in comparison with control resins. Those resins also showed good adhesion to a glass surface. Furthermore, it can be seen that optional presence of other copolymerizable monomers can be quite beneficial. For example, 3 parts of trimethylolpropane monoallyl ether increased the heat stability significantly, and 0.4 parts of octadecyl vinyl ether reduced the fisheyes to zero. The copolymers of vinyl chloride in the range of 70 weight % to 99 weight % with 0.05–15 weight % of allyl glycidyl ether and 0.05–15 weight % of vinyl acetate will perform quite well as a thermoplastic resin which can be compounded to prepare films with excellent heat stability, low haze, and good adhesion. A judicious choice of other copolymerizable monomer(s) will further the properties of the resins advantageously. A presence of a proper kind of silane compound will augment the adhesion strength to glass surfaces. Those same copolymers can also be used as the binder for ferrite powders with a proper compounding; as a binder for other types of metal or metal oxide powders for magnetic tape applications; and even as a coating for aluminum containers or sheets.

TABLE 1

|  | Control A | Control B | P1 | P2 | P3 | P4 |
|---|---|---|---|---|---|---|
| Vinyl Chloride | 100 | 100 | 100 | 100 | 100 | 100 |
| Deionized Water | 150 | 150 | 150 | 150 | 150 | 150 |
| Initiator | 0.35 | 0.35 | 0.35 | 0.35 | 0.35 | 0.35 |
| Emulsifiers | 0.144 | 0.144 | 0.144 | 0.144 | 0.144 | 0.144 |
| Glycidyl methacrylate | 3 | — | — | — | — | — |
| Allyl glycidyl ether | — | — | 3 | 1 | 3 | 3 |
| Vinyl acetate | 1 | 3 | 0.5 | 1 | 1 | 1 |
| Octadecyl vinyl ether | — | — | — | 0.4 | — | 0.4 |
| Trimethylol-propane monoallyl ether | — | — | — | — | 3 | — |
| Degree of polymerization | 800 | 1150 | 550 | 730 | 530 | 610 |
| Bulk density (g/cc) | 0.46 | 0.54 | 0.58 | 0.56 | 0.59 | 0.48 |
| PTU (%) | 10 | 12 | 10 | 12 | 11 | 21 |

TABLE 1-continued

| | Control A | Control B | P1 | P2 | P3 | P4 |
|---|---|---|---|---|---|---|
| Average particle size ($\mu$m) | 200 | 173 | 150 | 152 | 250 | 85 |
| Fisheyes | 250 | 55 | 40 | 0 | 75 | 0 |
| Haze (%) | 12 | 10 | 1 | 1.7 | 2 | 1 |
| Heat stability (minutes) | 45 | 40 | 90 | 75 | 100 | 90 |

Initiator: Di(2-ethylhexyl) peroxydicarbonate
Emulsifiers: Polyvinyl alcohol with 72.5% hydrolysis 0.072; Polyvinyl alcohol with 40% hydrolysis
Fisheyes: Number of gels/100 cm$^2$
PTU: Plasticizer take-up (plasticizer absorption)

EXAMPLE 2

In order to test the resin for use in laminated safety glass applications, samples were dry blended with a range of plasticizer and stabilizer combinations, and were then milled at a roll temperature of approximately 300° F. for 7 minutes. The milled films were then laminated between two sheets of 0.088" flat glass using an autoclave at 300° F. and 240 psi for 45 minutes. The laminates were then tested for haze, yellowness index, pummel adhesion, and thermal stability as a function of time at 100° C. These results are shown in Table 2.

As shown by these examples, the copolymers of this invention can be used to make interlayers for safety glass laminates that simultaneously exhibit low haze, good thermal stability, and good adhesion to glass without the need for the undesirably high process temperatures required of plastisol type or polyvinyl chloride homopolymer resins.

TABLE 2

| Component | A (phr) | B (phr) | C (phr) |
|---|---|---|---|
| P4 | — | 95 | — |
| P1 resin | 92 | — | 95 |
| CAPA 650[1] | 8 | 5 | 5 |
| n-octyl decyl adipate (NODA) | 36 | 17 | 17 |
| dihexyl adipate (DHA) | 4 | 17 | 17 |
| Drapex 6.8[2] | 5 | 5 | 5 |
| Meister CZ5062[3] | 3 | — | — |
| UBZ 7910[4] | — | 3 | 3 |
| Tinuvin 328[5] | 0.2 | 0.2 | 0.2 |
| CPL-46[6] | 0.1 | 0.1 | 0.1 |
| Irganox 1010[7] | 0.5 | 0.5 | 0.5 |
| Y9669[8] | 0.75 | 1 | 0.1 |
| Haze | 0.6 | 0.6 | 0.6 |
| Pummel | 10 | 4 | 3 |
| $\Delta YI_c$ after 500 hrs at 100° C. | 4 | 4 | 3 |

[1]Polycaprolactone resin available from Solvay Interox.
[2]Epoxidized soybean oil available from Witco Corp. of Oakland, NJ.
[3]Calcium zinc stabilizer available from Meister of Switzerland.
[4]Barium/zinc stabilizer package available from Baerlocher USA of Dover, OH.
[5]Benzatriazole ultraviolet light stabilizer available from Ciba-Geigy Corp.
[6]Perchlorate stabilizer available from Asahi Denka Kogyo K.K. of Japan.
[7]Hindered phenolic antioxidant available from Ciba-Geigy Corp.
[8]Phenylaminopropyltrimethoxysilane available from OSI, Inc.

In accordance with the provisions of the patent statutes, the invention has been described in what is considered to represent its preferred embodiments. However, it should be noted that the invention can be practiced otherwise than as specifically illustrated and described without departing from its spirit or scope.

What is claimed is:

1. A laminated glazing unit, comprising a first glass sheet, a second glass sheet and an interlayer adhered therebetween, said interlayer being formed of a film including a vinyl chloride copolymer formed by the suspension polymerization of a monomer mixture including vinyl chloride, allyl glycidyl ether, and a vinyl ester, said copolymer has a particle size of at least about 10 microns ($\mu$m).

2. A laminated glazing unit as defined in claim 1, wherein said vinyl chloride copolymer is prepared by the suspension polymerization of a monomer mixture including at least about 70% by weight vinyl chloride, from about 0.05% by weight to about 15% by weight allyl glycidyl ether, and from about 0.05% by weight to about 15% by weight of a vinyl ester.

3. A laminated glazing unit as defined in claim 2, wherein said vinyl ester is vinyl acetate.

4. A laminated glazing unit as defined in claim 1, wherein said monomer mixture further includes an allyl ether or mixture of allyl ethers, the amount of which does not exceed about 20% by weight of said total monomer mixture.

5. A laminated glazing unit as defined in claim 4, wherein said allyl ether is trimethylolpropane monoallyl ether.

6. A laminated glazing unit as defined in claim 1, wherein the degree of polymerization of said copolymer is at least about 530.

7. A laminated glazing unit as defined in claim 6, wherein the degree of polymerization of said copolymer is at least about 900.

8. A laminated glazing unit as defined in claim 1, wherein said interlayer, when formed as a film of nominal thickness of about 30 mils and laminated between a pair of glass sheets each having a nominal thickness of about 88 mils, having a pummel value of at least 3 and a haze value of less than 1%.

9. A laminated glazing unit, consisting essentially of a first glass sheet, a second glass sheet and an interlayer adhered therebetween, said interlayer being formed of a film including a vinyl chloride copolymer formed by the suspension polymerization of a monomer mixture including vinyl chloride, allyl glycidyl ether, and a vinyl ester, the degree of polymerization of the copolymenr being at least about 400, said copolymer has a particle size of at least about 10 microns ($\mu$m); and the unit having a pummel value of at least 3 and a have value less than about 1%.

10. A laminated glazing unit as defined in claim 9 in which the monomer mixture for the copolymer is about 100 parts by weight of vinyl chloride, about 3 parts by weight of allyl glycidyl ether and about 0.5 parts by weight of vinyl acetate.

11. A unit as defined in claim 9, in which the yellowness index ($\Delta \gamma I_c$) after 500 hours is about 3–4.

12. A laminated glazing unit as defined in claim 9 in which the particle size of the copolymer is at least about 30 microns.

13. A laminated glazing unit as defined in claim 9 in which the haze value is 0.6%, the pummel value is about 3 to 10 and a yellowness index after 500 hours of 3 to 4.

14. A laminated glazing unit, comprising a first glass sheet, a second glass sheet and an interlayer adhered therebetween, said interlayer being formed of a film including a vinyl chloride copolymer formed by the suspension polymerization of a monomer mixture including vinyl chloride, allyl glycidyl ether, and a vinyl ester, said copolymer has an average particle size of at least about 10 microns ($\mu$m).

* * * * *